Figure 1:
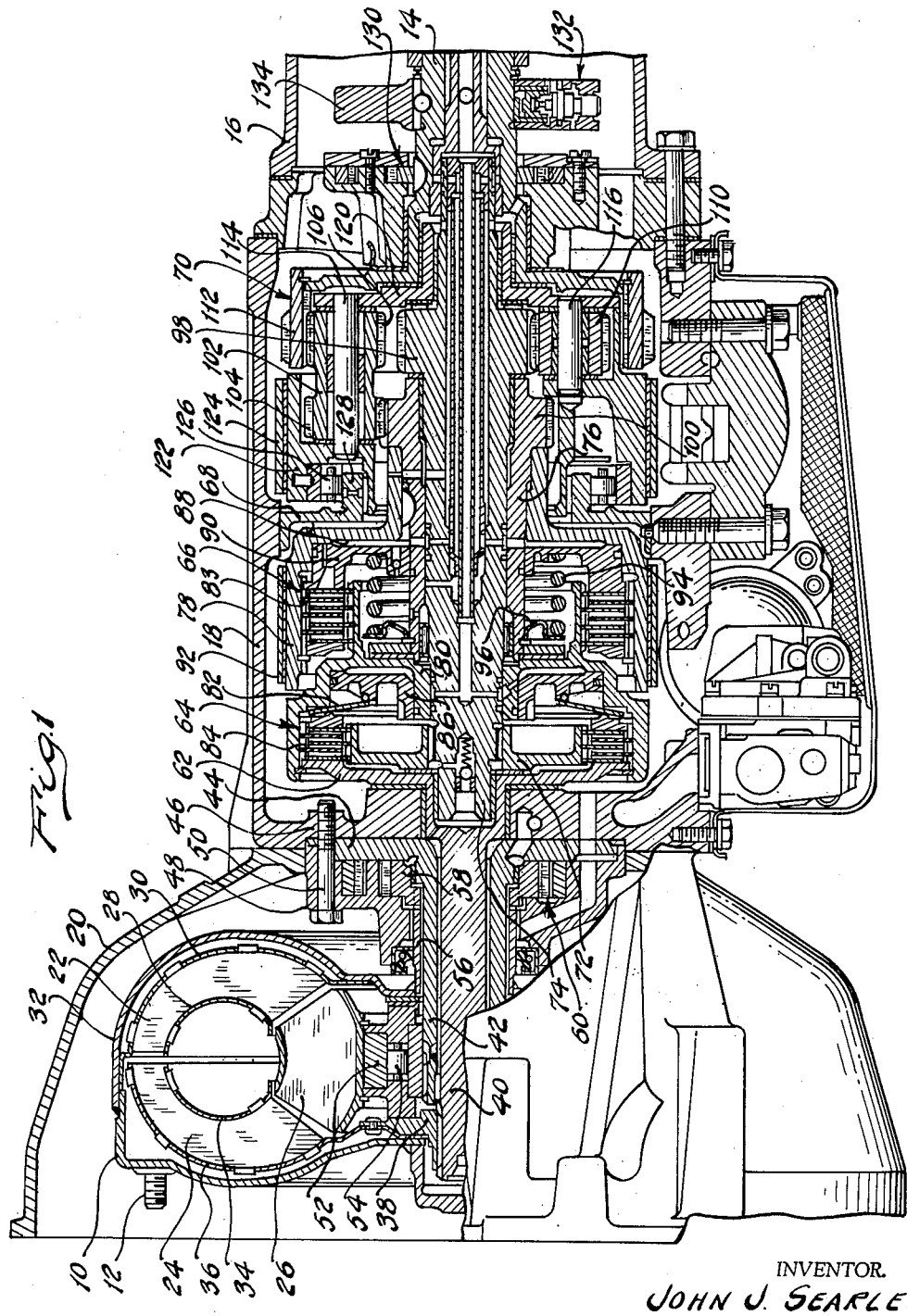

Nov. 24, 1964     J. J. SEARLES     3,158,037
CONTROL VALVE SYSTEM
Filed Oct. 12, 1962     3 Sheets-Sheet 1

INVENTOR.
JOHN J. SEARLES
ATTORNEYS.

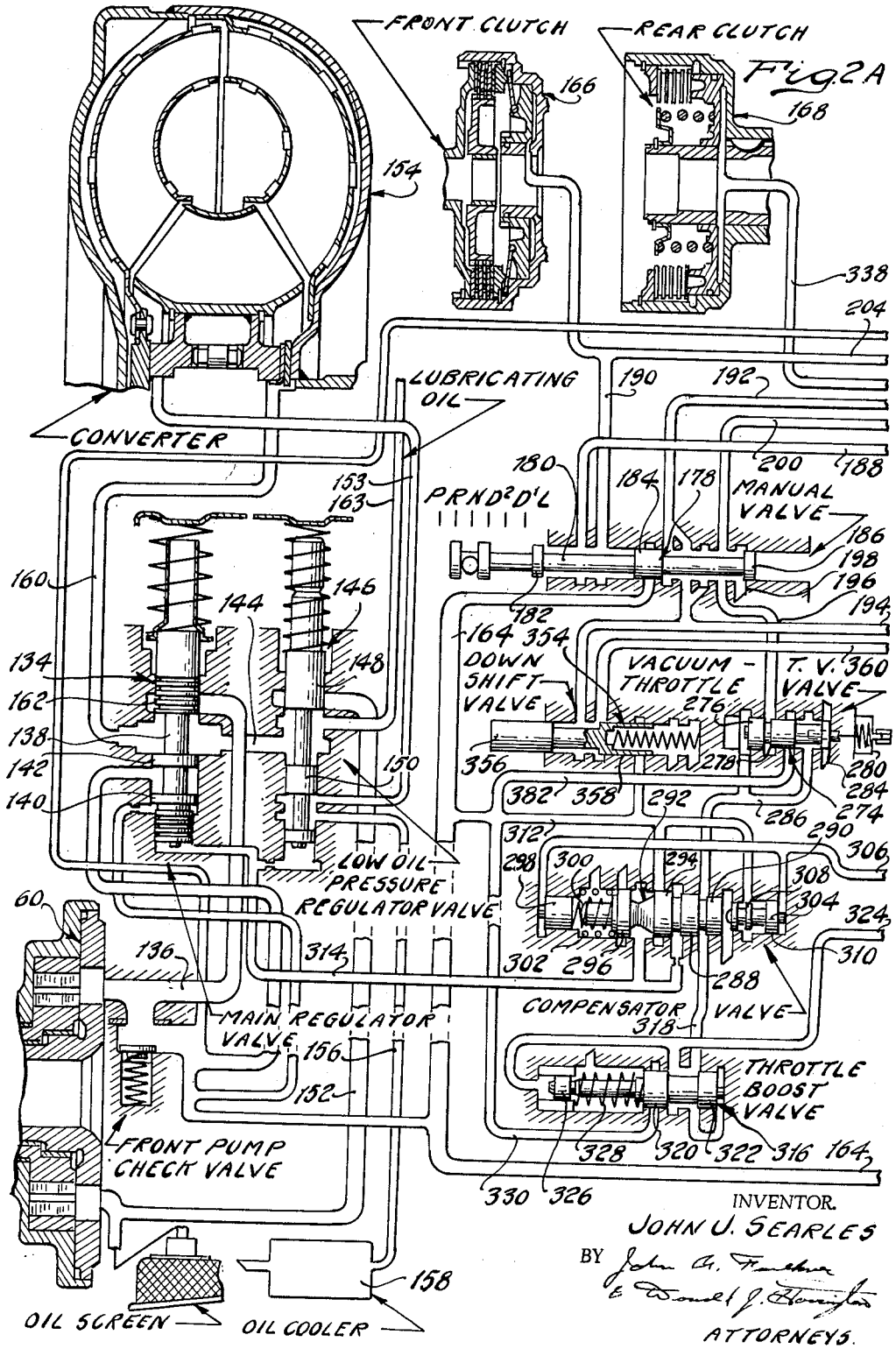

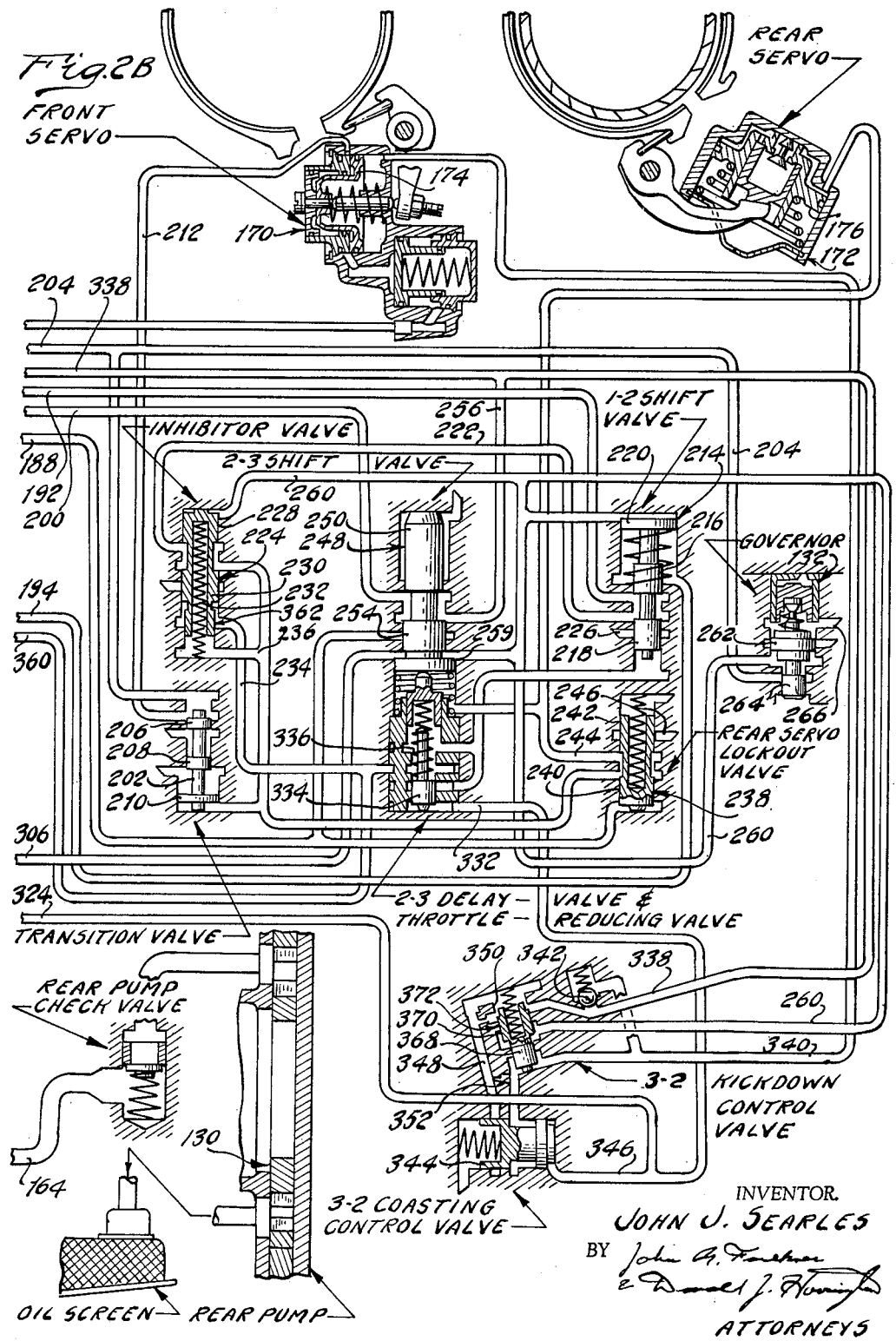

United States Patent Office

3,158,037
Patented Nov. 24, 1964

3,158,037
CONTROL VALVE SYSTEM
John J. Searles, Garden City, Mich., assignor to Ford Motor Company, Dearborn, Mich., a corporation of Delaware
Filed Oct. 12, 1962, Ser. No. 230,105
4 Claims. (Cl. 74—472)

My invention relates generally to control valve mechanisms for controlling automatically the operation of fluid pressure operated elements, and more particularly to improvements in a control valve circuit for use with an automatic power transmission mechanism.

The improvement of my invention is adapted particularly to be used in control circuits for automatic power transmission mechanisms for automotive vehicles. One such transmission mechanism and control circuit is disclosed in the pending application of James J. Duffy, Serial No. 6,703, now U.S. Patent No. 3,095,755, which is assigned to the assignee of my invention. The transmission mechanism with which the Duffy circuit is used includes torque transmitting gear elements that form multiple torque delivery paths capable of providing a range of torque ratios. The relative motion of the gear elements can be controlled by clutch and brake members that in turn are actuated by fluid pressure operated servos. Control pressure is supplied to the servos by control pumps driven by the engine and by the transmission tailshaft. The control valve circuit functions to distribute the circuit pressure of the control pumps to the servos thereby selectively operating the same to establish various torque ratio shifts. It is sensitive to vehicle speed as well as engine intake manifold pressure and calibrated suitably to provide the optimum speed ratio for each driving condition.

During low speed ratio forward drive operation of the vehicle, the torque reaction of the gear elements shown in application Serial No. 6,703, now U.S. Patent No. 3,095,755, is distributed through an overrunning brake into the relatively stationary transmission housing. During operation in reverse the same gear element of the gear unit provides the necessary driving torque reaction. The overrunning brake, however, is incapable of accommodating the reverse torque reaction, and for this reason a friction band brake is provided to supplement the action of the overrunning brake.

To condition the transmission mechanism for reverse drive operation, the operator adjusts a manual valve to permit direct pressure distribution from the control pressure source to a reverse drive clutch and the reverse servo for the low and reverse speed friction brake.

The magnitude of the control pressure made available to the clutch and brake servos is influenced by variations in engine torque and the speed of the driven member. This pressure regulation is obtained by means of a pressure regulator system that responds to the signals of a throttle valve and a governor valve.

The low and reverse friction brake is of a band type that is self-energizing under reverse torque conditions to increase its braking capacity. This same brake can be applied, however, during forward drive operation by appropriately positioning the manual valve. Under such driving conditions the control system will inhibit an upshift from the lowest speed ratio, and the transmission mechanism will operate continuously in that ratio until the manual valve is adjusted to either the normal forward drive position or the reverse position. Provision is made for increasing the circuit pressure in those instances when the low and reverse brake servo is applied. This is accomplished by using a pressure regulator valve system that responds to a pressure build-up in the low and reverse brake servo. This increases the torque transmitting capacity of the friction elements as the low and reverse brake servo is applied.

It is possible in such a transmission to shift the manual valve from the neutral position directly to the reverse position and vice versa without passing any intermediate position. When such a shift is made under engine idling conditions or under conditions in which the engine throttle is only partly open, the circuit pressure is increased to the maximum value permitted by the control pressure source. This is due to the sensitivity of the regulator valve system to the pressure in the low and reverse brake servo. For this reason, the pressure made available to the low and reverse brake servo is far in excess of that which is needed to accommodate the engine torque during closed or partly closed throttle conditions. This results in an undesirable harsh engagement of the low and reverse brake. It also overstresses the servo and servo force transmitting elements as well as the portion of the casing to which the servo structure is secured. Repeated shifts between the neutral and reverse positions therefore cause repeated stress reversals that contribute to premature structure failures.

The existence of an unnecessarily high pressure under such minimum torque conditions results also in an overstressing of the friction clutch structure. This is of particular significance if the clutch includes a clutch servo piston return spring of the Belleville type. Such clutch release or return springs are subject to fatigue after repeated stressing and may take a permanent set.

It has been found also that the existence of an excessively high circuit pressure under minimum throttle operating conditions aggravates unnecessarily the transmission oil cooling problem.

The improvements of my invention eliminate the foregoing disadvantages by reducing the degree of circuit pressure modification upon application of the low and reverse servo. The degree of modification in circuit pressure that may be obtained with my improved system is variable and dependent upon the torque transmitting requirements. This is in contrast to the earlier arrangement described in the foregoing paragraphs wherein the modification was of constant value. The magnitude of that constant value is determined by the most extreme operating conditions that could be anticipated.

The provision of improvements of the type above set forth being a principal object of my invention, it is a further object of my invention to provide a control system having fluid pressure operated servos wherein a modification in the normal circuit pressure is experienced when one of the servos is actuated thereby modifying accordingly the torque transmitting capacity of the servos.

It is a further object of my invention to provide a control system of the type above set forth in the foregoing objects wherein the magnitude of the circuit pressure modification depends upon the torque transmitting requirements of the servos.

It is a further object of my invention to provide a control system for an automatic power transmission mechanism that includes fluid pressure operated servos and wherein provision is made for cushioning the application of the servos when they establish a torque transmitting path.

For the purpose of describing more particularly the improvements of my invention, reference will be made to the accompanying drawings, wherein:

FIGURE 1 shows in cross section form a power transmission assembly capable of being used with my improved control system; and FIGURES 2A and 2B show a control system incorporating the improvements of my invention.

Referring first to FIGURE 1, the torque transmitting assembly will be described very briefly. This is done merely to provide a better understanding of the mode of operation of my improved control system.

Description of Torque Transmitting Mechanism of FIGURE 1

A power input drive shell member is indicated in FIGURE 1 by numeral 10. This member 10 may be bolted by means of bolts 12 to a drive plate, not shown. The drive plate is adapted to be connected to a vehicle engine crankshaft.

Numeral 14 designates a power output or driven shaft which may be drivably connected to the power input pinion of a differential drive gear associated with the vehicle traction wheels.

The transmission housing is formed with three parts. These are identified respectively by reference characters 16, 18 and 20. They may be bolted in end-to-end relationship, the housing part 16 enclosing the power output shaft 14, the housing part 18 enclosing the gear elements of the clutch and brake structure and the housing part 20 enclosing a hydrokinetic torque converter.

The torque converter is comprised of a bladed hydrokinetic pump 22, a cooperating turbine 24 and a stator or reactor 26. The pump 22 includes an inner shroud 28 and an outer shroud 30. The converter pump blades are situated between the shrouds 28 and 30. The outer shroud 30 is connected drivably to a pump shell 32 that in turn is connected to the member 10.

The pump 22 is situated in toroidal fluid flow relationship with respect to the turbine 24. Inner and outer turbine shrouds are shown at 34 and 36, respectively. They define a troidal flow path through the turbine blades. The outer shroud 36 is coupled drivably to hub member 38 which is splined in turn to turbine shaft 40. Shaft 40 is situated in concentric relationship with respect to a stator sleeve shaft 42 which in turn is flanged at 44 to permit a fixed connection with a radially inwardly extending wall 46 of the casing part 18. A front pump housing 48 is secured also to the wall 46. If desired, common bolts 50 can be provided for the housing 48 and the flange 44.

The stator 26 includes a hub 52 that is adapted to be anchored to the stationary sleeve shaft 42 by means of an overrunning brake 54.

The pump shell 32 is secured by welding to a sleeve 56 that may be keyed or otherwise connected to a drive gear 58 for a transmission control pump. This pump, which is identified by reference character 60, forms a part of the control circuit of FIGURES 2a and 2b.

Turbine shaft 40 is journaled within an opening in wall 46 and is formed with a flanged part 62.

A forward drive front clutch is identified generally by reference character 64.

A rear clutch, hereinafter referred to also as a high speed clutch, is identified by reference character 66. Both clutches 64 and 66 are located in a common portion of the housing part 18 that is defined partly by separator wall 68. This wall defines also a second housing portion within which a compound planetary gear unit 70 is situated.

Clutch 64 includes an externally splined disc carrier member 72 that is splined in turn to an intermediate shaft 74. A sleeve shaft 76 is positioned in concentric relationship with respect to shaft 74. The left end of shaft 74, as viewed in FIGURE 1, is journaled within turbine shaft 40 and shaft 76 is keyed to a drum member 78 for the clutch 66. This drum member is internally splined so that it is adapted to carry externally splined clutch discs.

Journaled upon shaft 74 also is a clutch member 80 having an externally splined extension 83 that carries internally splined clutch discs for the clutch 66. Member 80 includes also an internally splined portion 84 adapted to carry externally splined discs of clutch 64.

Member 80 defines an annular cylinder within which an annular piston 86 is situated. The piston 86 with its cooperating cylinder defines a fluid pressure working chamber and the fluid pressure distributed thereto creates a force that is magnified and transferred by means of a Belleville spring 86 to the multiple disc clutch pack for clutch 84. When the piston 86 is loaded, a driving connection thus is established between shaft 40 and shaft 74.

Clutch member 78 also defines an annular working cylinder 88. Situated within the cylinder 88 is an annular piston 90 that defines a working chamber. When this chamber is pressurized, the clutch discs of clutch 66 establish a driving connection between clutch member 80 and member 78.

A brake band 92 encircles member 78, and when it is energized by means of a servo later to be described, it anchors member 78 against the housing part 18.

A return spring 94 acts against the piston 90. It is anchored by means of an anchor member 96 carried by sleeve shaft 76. When the clutch 66 is energized a driving connection then is established between clutch member 80 and shaft 76.

A first sun gear 98 is connected to shaft 74 and a second sun gear 100 is connected to shaft 76. A first compound planet pinion set is shown in part at 102. Each pinion of the pinion set 102 includes two pinion elements 104 and 106. Pinion element 104 drivably engages sun gear 100 and pinion element 106 drivably engages a pinion of a second pinion set 110. The pinions of the second pinion set 110 drivably engage the pinion element 106 of the first pinion set. Pinion element 106 engages also a ring gear 112 that in turn is connected drivably to shaft 14.

Pinion elements 104 and 106 are carried by planet pinion shafts 114 and the pinions of set 110 are carried by planet pinion shaft 116. Shafts 114 and 116 in turn are carried by a carrier 120.

Brake drum 122 is secured to carrier 120 and forms a part thereof. A brake band 124 surrounds the drum 122 and anchors it when it is energized. Brake drum 122 can be anchored also by an overrunning brake comprising rollers 126 disposed between cooperating cam surfaces carried by drum 122 and extension 128 that forms a part of partition wall 68.

Power output shaft 14 is connected drivably to a positive displacement pump 130 that also forms a part of the control circuit of FIGURES 2A and 2B. A governor valve mechanism also is connected to shaft 14. This mechanism, which is generally identified by reference character 132, also forms a part of the control circuit of FIGURES 2A and 2B. The counterweight for the valve mechanism 132 is shown at 134.

Statement of Operation of the Transmission Mechanism of FIGURE 1

Engine torque is delivered to the pump 22 and is multiplied by the torque converter at reduced converter speed ratios in the usual fashion. The output torque of the turbine 24 is distributed to the turbine shaft 40. During forward drive operation in the lowest speed ratio, clutch 64 and brake 124 are applied. But normally the brake 124 remains released although the carrier 122 still is anchored by reason of the overrunning brake 126. Brake 124 is applied during operation in emergency low and reverse as will subsequently be explained.

During operation in the lowest speed ratio condition, turbine torque is delivered through applied clutch 92 to the sun gear 98. Gear 98 causes pinions 110 to rotate which in turn rotate compound pinions 102. Pinions 102 in turn cause ring gear 112 to rotate in the same direction as sun gear 98 although at a reduced speed. Rotary motion, of course, then is transferred to power output shaft 14.

To condition the transmission for intermediate speed ratio operation, brake 92 is applied. This anchors sun gear 100. The rotation of pinions 102 thus causes the pinion elements 104 to rotate about the anchored sun gear 100. This increases the effective speed ratio of the planetary gear unit 70 and ring gear 112 thus rotates at a faster speed relative to the speed of the sun gear 98 than during operation in the low speed ratio condition.

During high speed ratio operation, brake 92 is released and clutch 66 is applied. Since both clutches 64 and 66 then are applied, the planetary gear unit 70 becomes locked up for 1:1 speed ratio operation.

*Description of Control Circuit of FIGURES 2A and 2B*

In the control system of FIGURES 2A and 2B the output pressure of pump 60 is distributed to a main pressure regulator valve 134 through a passage 136. The valve 134 includes a multiple land valve spool 138. Two of the valve lands for spool 138 define a differential area 140. A land 142 establishes a controlled degree of communication between passage 136 and a passage 144. Passage 144 in turn communicates with a low pressure regulator valve 146. It includes valve lands 148 and 150 that are formed with differential areas so that land 148 controls communication between passage 144 and passage 152, the latter in turn communicating with the transmission sump and the intake of the pump 60.

A converter feed line 153 extends from the regulator valve 146 at a location below land 150 to a converter return passage 154. A similar passage 156 extends from that same location to an oil cooler 158 that communicates in turn with the transmission sump.

A converter feed passage 160 communicates with the regulator valve 134 at a location below a regulator valve land 162. A lube oil passage 163 communicates with regulator valve 146 below land 148.

Immediately upon starting the engine, the pump 60 begins to develop pressure. At this instant both regulator valves 134 and 146 are urged toward a fully downward position by their respective valve springs. Under these circumstances, passage 162, passages 154 and 156 and passage 160 are blocked. As the pump pressure begins to develop, that same pressure is distributed to main supply passage 164 and is utilized to develop full circuit pressure in the control valve system before the pressure requirements of the torque converter and the lubricating oil supply passages are satisfied.

After the circuit pressure is developed sufficiently, regulator valve land 162 begins to regulate the pressure in passage 136. This causes a reduced pressure to develop in passages 160 and 144. At a certain predetermined pressure in the passage 144 the valve 146 is urged in an upward direction by reason of the differential area of valve lands 148 and 150. This causes lubricating oil pressure to be made available to passage 162. Land 148 establishes a regulating action between passages 162 and 152. Upon movement of the valve 146 in an upward direction, the passage 154 leading from the discharge side of the torque converter is opened thus establishing communication with the oil cooler 158 through passage 156.

A fluid pressure operated servo for the front clutch is identified generally by reference character 166. A corresponding clutch servo for the rear clutch is shown at 168. A front brake servo and a rear brake servo are identified respectively by reference characters 170 and 172. Servo 170 comprises a servo piston 174 that defines in part two opposed working chambers. In contrast, servo 172 has a single acting piston 176 that defines but a single working chamber.

A manual valve 178 is under the control of the vehicle operator. It includes a valve spool 180 that can be adjusted manually to any one of the six positions identified in FIGURE 2A. These positions are identified respectively by the symbols P, R, N, $D^2$, $D^1$ and L which respectively correspond to park, reverse, neutral, drive 2, drive 1 and low. Valve element 180 includes valve lands 182, 184 and 186. Passage 164, previously referred to, communicates with the manual valve 178 and is blocked by valve land 184 when the valve element 180 assumes a neutral position as indicated in FIGURE 2A. Communicating also with the manual valve 178 are passages 188, 190, 192, 194 and 196. An exhaust port is shown at 198.

If it now is assumed that the manual valve is shifted to the $D^1$ position, passages 188 and 190 will be pressurized since valve land 184 will uncover passage 164. Passage 192 also will be uncovered and will be pressurized, but passage 194 will remain covered. Passage 194 instead communicates with exhaust port 198. Passage 200 also communicates with the manual valve 178 and with exhaust port 198 whenever the manual valve assumes the $D^1$ position.

Passage 190 distributes fluid pressure to the front clutch servo 166 whenever it is pressurized. It distributes pressure also to the upper end of a transition valve shown at 202 and also to the governor 132. A branch passage 204 extends from the passage 190 to the governor 132 for this purpose.

The transition valve 202 includes two small valve lands 206 and 208 and a relatively large valve land 210. Each land is positioned slidably within a cooperating valve bore. When the transition valve 202 is in the position shown in FIGURE 2B, communication is established between passage 190 and a passage 212 extending to the brake apply side of brake servo piston 174. This allows the front brake to become applied.

The passage 192 normally is exhausted when the manual valve 178 is in the $D^1$ position as previously explained. This passage 192 communicates with a 1–2 shift valve 214 having a pair of spaced valve lands 216 and 218. A relatively large valve land is shown at 220.

Valve lands 216 and 218 control communication between passage 192 and a passage 222 that extends to an inhibitor valve 224. When the shift valve 214 is in an upward position as shown in FIGURE 2B, free communication is established between these passages 192 and 222. It is held normally in this position by a valve spring as indicated. When the shift valve 214 assumes a downward position, however, such free communication is interrupted and communication then is established between passage 222 and an exhaust port 226.

Inhibitor valve 224 includes spaced valve lands 228, 230 and 232. The valve lands 230 and 232 define a differential area that communicates with a passage 234, the latter in turn being subjected to throttle pressure as hereinafter described. Inhibitor valve 224 normally is urged in an upward direction to establish communication between passage 222 and a passage 236 communicating with the lower end of the inhibitor valve and the lower end of passage 210 of the transition valve.

The previously mentioned passage 188 communicates with the lower end of a rear servo lockout valve 238. The valve includes a valve land 240 and a valve land 242. It is urged normally in a downward direction by a valve spring as indicated to establish communication between passage 236 and a passage 244 which extends to the apply side of the rear servo piston 176. Passage 244 communicates also with the lower land of the 2–3 shift valve as subsequently will become apparent.

Upon introduction of pressure to passage 188, the rear servo lockout valve is urged in an upward direction to establish communication between passage 244 and an exhaust port 246 and block passage 234.

A 2–3 shift valve is identified generally by reference character 248. It includes spaced valve lands 250 and 254 that control communication between passage 188 and a passage 256 that extends to the rear or high speed clutch servo 258. When the valve 248 is positioned as shown, passage 256 is exhausted through passage 200 and exhaust port 198. If, however, the valve 248 is moved in a downward direction, communication is established between passage 256 and passage 188.

A relatively large diameter valve land 259 is formed also on valve 248. Lands 254 and 258 define a differential area that is subjected to governor pressure in passage 260.

Governor pressure is supplied to passage 260 in a manner subsequently to be described. The 2-3 shift valve 248 normally is urged in an upward direction by an associated valve spring as indicated. The chamber occupied by the spring is in fluid communication with passage 244 as previously indicated.

Referring next to the governor 132, it includes a pair of spaced valve lands 262 and 264. Governor pressure passage 260 communicates with the chamber occupied by the governor valve at a location between valve lands 262 and 264, the latter defining a differential area upon which governor pressure is caused to act. Upon rotation of the transmission driven member, the governor valve is urged in a radially outward direction thus tending to uncover passage 204. At the same time land 262 tends to cover passage 266 as the governor valve is urged radially outward. The pressure then made available to passage 260 is a modulated pressure, the magnitude of which is dependent upon the speed of rotation of the governor valve. For a particular description of this governor valve structure, reference may be made to Patent No. 3,043,322.

The output speed signal of the governor valve 132 is distributed through passage 260 to the upper side of land 220 of the shift valve 214. It is distributed also to the differential area defined by valve lands 254 and 258 of the 2-3 shift valve 248. Passage 260 distributes also governor pressure to the upper end of the land 228 of the inhibitor valve 224. In each intsance the governor pressure tends to urge the 1-2 shift valve, the 2-3 shift valve and the inhibitor valve in a downward direction as viewed in FIGURE 2B. Governor pressure in passage 260 acts also upon a differential area defined by valve lands 268 and 270 of the 3-2 kickdown control valve 272. The function of this 3-2 kickdown valve will be explained subsequently.

A vacuum TV throttle valve is shown generally by reference character 274. It includes spaced valve lands 276 and 278 that define a differential area. Valve 274 is connected mechanically to a movable diaphragm member of an engine manifold vacuum operated servo 280. As the absolute engine manifold pressure is reduced, valve 274 is urged in a right-hand direction. As manifold pressure increases, valve 274 is allowed to move in a left-hand direction under the influence of a spring that acts upon the diaphragm. Control pressure is distributed to valve 274 through a passage 282 communicating with passage 164. An exhaust port is shown at 284. The output pressure of the valve 274 is a modulated pressure in passage 286. This pressure is allowed to act upon the left-hand end of valve land 276. Thus, the magnitude of the pressure in passage 286 is a function of engine manifold pressure.

Passage 196 normally is exhausted through exhaust port 198 formed in the manual valve 178. If, however, the manual valve is shifted to the reverse position from the neutral position shown in FIGURE 2A, then control pressure is distributed to the differential area defined by lands 276 and 278 through passage 196. But if the manual valve 178 is shifted to the park position or any position other than the reverse position, exhaust port 198 will be in communication with passage 196.

The pressure in passage 286 acts upon a differential area defined by lands 288 and 290 of a compensator valve generally identified by reference character 292. This compensator valve includes also lands 294 and 296 and a valve plunger 298, the latter being separated from the main valve portion of valve 292 by a spring 300. Spring 300 supplements the action of a second spring 302 situated between the relatively stationary valve body and the main portion of valve 292.

A speed sensitive plunger 304 is disposed at one side of the compensator valve 292. The right-hand side of plunger 304 is subjected to the governor pressure distributed thereto through passage 306 which communicates with the previously described passage 260. Control pressure is distributed to a differential area defined by valve lands 308 and 310 on the plunger 304. This control pressure is distributed in this fashion through passage 312.

The governor pressure in passage 306 is distributed also to the left-hand side of the plunger 298. It will be apparent from the foregoing that the compensator valve 292 is capable of modulating the control pressure that is distributed to it from passage 312. The resulting compensator pressure is distributed to a so-called compensator pressure passage 314 which in turn communicates with the lower end of the regulator valves 134 and 146. Thus, the pressure in passage 314 will oppose the force of the main regulator valve spring and the low pressure regulator valve spring. As this pressure increases, the magnitude of the regulated pressures made available by the regulator valves are decreased. Conversely, if the pressure in passage 314 decreases, the regulated pressures made available by the pressure regulator valves increase.

If the magnitude of the governor pressure in passage 306 increases beyond a predetermined value for any given engine manifold pressure, plunger 304 will move against the main portion of valve 292. Thus, a change in the magnitude of the pressure in passage 306 will result in a force acting upon the valve 292 in a left-hand direction that is balanced and opposed by a corresponding force acting upon the valve element 298 in the opposite direction. The compensator valve then is rendered insensitive to changes in speed as the vehicle accelerates further for that given engine manifold pressure.

The vacuum TV throttle valve pressure is distributed to a throttle boost valve 316 through a passage 318. The throttle boost valve 316 comprises a valve spool situated within a valve chamber. It is formed with spaced valve lands 320 and 322 that normally establish free communication between passage 318 and a throttle boost valve pressure passage 324. The pressure in passage 318 acts on the right-hand side of valve land 322 as viewed in FIGURE 2A. This produces a pressure that is opposed normally by the force produced by the pressure in passage 324 acting upon the left-hand side of the valve plunger 326 as viewed in FIGURE 2A. Valve 316 normally is urged in a right-hand direction by valve spring 328. The diameter of plunger 326 is less than the diameter of valve land 322. As the magnitude of the pressure in passage 318 approaches a predetermined value, the control pressure distributed to the valve 316 through passage 330 becomes modulated. This modulating action occurs, of course, since the spring chamber 328 is exhausted.

Thus, the control pressure augments the magnitude of the pressure signal in passage 324 which is the output signal of the throttle boost valve. This throttle boost valve output pressure is calibrated to establish the proper shift points for the 1-2 shift valve and the 2-3 shift valve. It is distributed to each of these valves through a passage 332 that communicates with passage 324.

Disposed in the passage 332 is a throttle boost valve modulator identified by reference numeral 334. This modulator is in the form of a spool that is spring urged by a spring 336 in a downward direction. It functions, therefore, to reduce the magnitude of the throttle boost valve pressure in passage 334. This reduced throttle boost valve pressure is distributed in turn to the lower end of the 2-3 shift valve spool and the lower end of land 218 on the 1-2 shift valve 214.

When the manual valve is in the $D^1$ position, pressure is distributed to the lower end of rear servo lockout valve 238. This causes the rear servo to become exhausted through exhaust port 246 of the rear servo lockout valve. The front clutch is pressurized under these conditions as previously explained. Thus, the transmission will operate in the lowest gear ratio when accelerated from a standing start. The torque reaction of the planetary gear unit is taken by the overrunning brake for the planetary carrier.

As the vehicle continues to accelerate for any given engine throttle setting, the 1–2 shift valve will be urged in a downward direction against the opposing influence of throttle boost valve pressure and spring pressure. This causes passage 222 to become exhausted through port 226. Thus, the pressure on the lower end of transmission valve 210 becomes exhausted and this valve moves in a downward direction under the influence of control pressure acting on the upper end of the valve 206. Communication then is established between passage 190 and passage 212 extending to the apply side of the intermediate speed servo 170. Thus, the front band is applied and the transmission then is conditioned for intermediate speed ratio operation. The overrunning brake for the carrier of the planetary gear unit overruns under these conditions since the front sun gear acts as a reaction member.

Upon a further increase in vehicle speed for any given throttle setting, the 2–3 shift valve moves in a downward direction against the opposing influence of modulated throttle boost valve pressure and spring force. Communication then is established between passage 188 and passage 256 extending to the rear clutch servo 168. This same pressure is distributed through passage 338 to passage 340 through a one-way check valve 342. The release side of the front brake servo 170 thus is pressurized and the servo assumes a released condition as the rear clutch is applied.

As the vehicle decelerates under closed throttle conditions, the 3–2 coasting control valve 344 moves in a right-hand direction as viewed in FIGURE 2B. This is done under the influence of a valve spring that acts upon the left-hand side of the 3–2 coasting control valve. Throttle boost valve pressure is applied to the right-hand side of the 3–2 coasting control valve through a passage 346. Thus, when the engine is delivering torque, the 3–2 coasting control valve is in a left-hand position and is effective to establish free communication between passage 340 and a branch passage 348. The passage 348 is formed in part by a restriction 350 provided by the 3–2 kickdown control valve. Passage 338 in turn communicates with passage 256 which is exhausted through passage 200 and exhaust port 198 as the 2–3 shift valve assumes an upward position.

It will be apparent, therefore, that if a downshift occurs under coasting conditions, the pressurized fluid that is released from the release side of the front brake servo 170 must pass through an orifice 352. This retards the rate of engagement of the front brake servo and cushions the downshift. As deceleration continues under these conditions, the 1–2 shift valve will subsequently move in an upward direction so that the transmission mechanism is conditioned for a low gear start upon subsequent acceleration.

If the vehicle speed is greater than a desired value, the inhibitor valve will move in a downward direction against the opposing influence of the spring 232. Thus, it is impossible to admit pressure to the lower end of the transition valve 202 or to the rear servo. This is a safety feature and prevents a forced downshift when the vehicle speed is higher than a safe value for such a downshift.

A forced downshift can be obtained by means of a downshift valve 354 that is under the control of the vehicle engine carburetor throttle. This downshift valve includes valve lands 356 and 358 that establish communication between passage 194 and a passage 360, the latter extending to the inhibitor valve and the lower end of each of the shift valves. In the position shown in FIGURE 2A, the downshift valve causes passage 360 to be exhausted through passage 194 and exhaust port 198. If, however, the vehicle operator moves the engine carburetor throttle to a fully opened position, passage 194 becomes blocked and communication is established between control pressure passage 312 and the passage 360. A forced downshift to any one of the lower speed ratios thus can occur depending upon the vehicle speed at which such a downshift is attempted. This so-called downshift valve control pressure influences the inhibitor valve by reason of the differential area formed by valve land 230 and an adjacent valve land 362. During a 3–2 kickdown shift the magnitude of the restriction offered by valve land 270 is greater at higher speeds than it is at lower speeds. This is because of the influence of the governor pressure in passage 260 that acts upon the differential area of valve lands 268 and 270. Thus, a higher degree of overlap between clutch release and band engagement is provided during forced downshift at high speed vehicle operation than during low speed vehicle operation.

The check valve prevents bypassing of the restriction of valve land 270 during such a downshift. It provides such bypass, however, during an upshift when such a restriction is not desired.

If the manual valve is shifted to either the $D^1$ or $D^2$ position, passage 188 is pressurized. Thus, the rear servo always is exhausted through exhaust port 246 in the rear servo lockout valve. If, however, the manual valve is moved to the $D^2$ position, passage 192 also is exhausted. Passage 192, however, remains exhausted when the manual valve is in a $D^2$ or $D^1$ position and operation of the shift valve will have no influence on the front servo. Thus, the front servo remains applied during acceleration from a standing start with the manual valve in the $D^2$ position. This is true since the passage 212 leading to the apply side of the front servo is pressurized because of the communication established between passage 212 and passage 190 by the transition valve 202. It is impossible then to move the transition valve in an upward direction since all of the passages that communicate with passage 236 are exhausted.

If the manual valve is moved to the low speed position, passage 194 becomes pressurized since communication is established between passage 164 and passage 194 through the manual valve by land 184. This causes the 1–2 shift valve to remain in an upward position. At the same time passage 188 becomes exhausted and the rear servo lockout valve therefore moves to a downward position as viewed in FIGURE 2B. Control pressure then is distributed from passage 192 through the 1–2 shift valve, through passage 222, through the inhibitor valve, through passage 236 and through the rear servo lockout valve to passage 244 that extends to the rear servo. This same pressure also acts upon the lower end of the 2–3 shift valve that is occupied by the 2–3 shift valve spring thus causing the 2–3 shift valve to maintain a downshifted position regardless of changes in vehicle speed. The transmission then will continue to operate in the low speed ratio condition and cannot be upshifted.

If the manual valve now is moved to a reverse drive position, passage 190 which extends to the front clutch becomes exhausted through the manual valve. At the same time land 186 on the manual valve covers port 198 and control pressure then is distributed to passage 200. Since the 2–3 shift valve now is in a downshifted position this same control pressure is distributed to the rear servo 168 through passage 256. Further, since the 1–2 shift valve is in a downshifted position, the control pressure that is made available to passage 192 is distributed through the 1–2 shift valve to passage 222 and through the inhibitor valve 224 to passage 236. This control pressure then is distributed through the rear servo lockout valve to passage 244 which extends to the rear servo 172. The rear servo lockout valve 238 assumes a downward position as viewed in FIGURE 2B since passage 188 is exhausted by the manual valve 178 under reverse drive conditions.

Since passage 198 then is covered, control pressure is distributed also to passage 196 thereby causing the vacuum TV throttle valve 274 to be loaded with control pressure which acts upon the differential area of lands 276 and 278. This tends to produce a resultant throttle pressure in passage 286 even though the engine throttle is fully closed. The magnitude of this throttle pressure in one preferred embodiment of my invention may be 17 p.s.i. This pressure acts upon the compensator valve and results in a compensator pressure in passage 314 in the manner previously described. This in turn results in a modification of the line pressure so that line pressure in the neighborhood of 90 p.s.i. is maintained. If a conventional vehicle engine is employed, this pressure is sufficient to accommodate the reverse torque requirements of the rear servo and the rear clutch under these minimum throttle reverse drive conditions. Unlike control systems of conventional constructions, the line pressure thus is limited under zero engine torque conditions to approximately 90 p.s.i. and it does not develop a magnitude equal to the maximum available control pressure of which the control pump 60 is capable. Thus, during a shift from neutral to reverse, the rear servo will become applied in a relatively gentle fashion.

As the vehicle engine throttle is advanced during operation in reverse, the vacuum TV throttle valve pressure will increase in the usual fashion. This increase in pressure of course tends to decrease the magnitude of the compensator pressure in passage 314 and increase the magnitude of the regulated line pressure. Thus, the braking capacity of the rear servo can be calibrated to accommodate any reaction torque that is required for any engine manifold pressure. Stated in a different way, the braking capacity of the rear servo is sufficient to accommodate any engine torque, but the capacity never is greatly in excess of that which is required.

As the manual valve is shifted to a park position, the passage 196 becomes exhausted through port 198. Thus, there is no tendency for the rear servo to cycle under the influence of high pressure during a shift from neutral to park as in the case of conventional control systems.

Having thus described a preferred embodiment of my invention, what I claim and desire to secure by U.S. Letters Patent is:

1. In a control system for a power transmission mechanism adapted to deliver torque from an engine to a driven member in a forward driving direction and in a reverse driving direction, fluid pressure actuated friction members adapted to establish in part torque delivery paths between said engine and said driven member, one friction member being engaged during torque delivery in a reverse driving direction and disengaged during torque delivery in a forward driving direction, a fluid pressure source, conduit structure interconnecting said source and said friction members, a movable selector valve means in said conduit structure for distributing pressure selectively to different regions of said conduit structure, one friction member being located in one region and another friction member being located in another region, valve means for establishing a regulated pressure signal that is influenced in magnitude by engine torque demand, separate branch passages extending from said selector valve means to each region, a regulator valve system having a regulator valve means for controlling the magnitude of the pressure made available by said pressure source, said selector valve means being adapted to cause one region to be pressurized upon movement thereof to one position thereby establishing a forward driving torque delivery path and to cause another region to be pressurized upon movement thereof to another position thereby establishing a reverse driving torque delivery path, said regulator valve system and said signal establishing valve means being in fluid communication whereby the magnitude of the controlled pressure of said source is made dependent upon torque demand, said selector valve means being adapted to control distribution of fluid pressure to said signal establishing valve means upon movement thereof from said one position to said other position whereby the influence of said signal upon the regulating characteristics of the regulator valve means is modified upon movement of said selector valve means to a position corresponding to reverse drive operation, the pressure regulator valve means being semi-isolated from said friction member and insensitive to changes in the distribution of pressures to said regions upon movement of said selector valve means between its two positions.

2. In a power transmission mechanism, a control system comprising torque delivery members adapted to establish plural torque delivery paths between a driving member and a driven member, one torque delivery member being adapted to condition said mechanism for torque delivery in one direction and the other torque delivery member being adapted to condition said mechanism for torque delivery in the opposite direction, fluid pressure operated servos adapted to control activation of said members, a fluid pressure source, conduit structure connecting said source and said servos, distribution valve means in said conduit structure for distributing selectively pressure made available by said source to said servos, a regulator valve system including regulator valve means in fluid communication with said source for maintaining a calibrated operating pressure in said servos and said conduit structure, a selector valve means in said conduit structure for controlling distribution of fluid pressure through said distributor valve means to said servos, torque demand sensitive valve means being in fluid communication with said regulator valve means for modifying the regulating characteristics of the latter in response to changes in torque demand, and a fluid connection between said selector valve means and said torque demand sensitive valve means, said selector valve means being adapted to distribute pressure through said connection when it is positioned to distribute pressure to one servo for reverse torque delivery and to interrupt such distribution when it is positioned to distribute pressure to another servo for forward torque delivery, the regulator valve means being semi-isolated from said servos and insensitive to changes in the distribution of pressures to said servos upon movement of said selector valve means between the two aforesaid pressure distributing positions.

3. In a power transmission mechanism adapted to deliver torque to a driven member from an engine having a fuel mixture intake manifold, a control system comprising fluid pressure actuated friction members adapted to establish in part torque delivery paths between said engine and said driven member to accommodate torque delivery in a forward driving direction and in a reverse driving direction, a fluid pressure source, conduit structure interconnecting said source and said friction members, a movable selector valve means in said conduit structure for distributing pressure selevtively to different regions of said conduit structure, one friction member being located in one region and another friction member being located in another region, valve means for establishing a regulated pressure that is sensitive to changes in the magnitude of engine manifold pressure, a regulator valve system having a regulator valve means for controlling the magnitude of the fluid pressure made available by said source, said selector valve means being adapted to pressurize one region upon movement thereof to one position to condition said mechanism for forward driving torque delivery and to pressurize another region upon movement thereof to another position to condition said mechanism for reverse driving torque delivery, one friction member being located in each region, said regulator valve system and said signal establishing valve means being in fluid communication, whereby the regulated pressure of said servos is rendered proportional to engine manifold pressure, said selector valve means being adapted to control distribution of said fluid pressure to said signal establishing valve means upon movement thereof from said one position to said other position whereby the influence of said signal upon the regulating characteristics of said regulator valve means is modified upon movement of said selector valve means to said other position, the pressure regulator valve means being insensitive to changes in the pressure distributed in said regions upon movement of said selector valve means between its two positions.

4. In a power transmission mechanism adapted to deliver torque to a driven member from an engine having a fuel mixture intake manifold, a control system comprising torque delivery members, fluid pressure operated servos adapted to control activation and deactivation of said members to condition said mechanism for forward driving torque delivery and for reverse driving torque delivery, a fluid pressure source, conduit structure interconnecting said source and said servos, distributor valve means situated in and partly defining said conduit structure for controlling distribution of pressure to said servos, shiftable valve means in said conduit structure for selectively distributing pressure made available by said source to said distributor valve means, a regulator valve system including regulator valve means having an element in fluid communication with said source for maintaining a calibrated operating pressure in said servos and said conduit structure, a compensator valve in fluid communication with siad regulator valve element, a source of a speed pressure signal that is proportional in magnitude to the driven speed of said driven member, a source of a pressure signal that is proportional in magnitude to changes in engine manifold pressure, branch portions of said conduit structure establishing communication between each signal source and said compensator valve to produce a resultant compensator pressure, another branch portion of said conduit structure being adapted to connect said compensator valve and said regulator valve element whereby variations in the magnitude of said compensator pressure modifies the regulating characteristics of said regulator valve means, and a fluid connection between said shiftable valve means and said manifold pressure signal source, said shiftable valve means being adapted to distribute pressure through said fluid connection when it is positioned to distribute pressure to one servo and to interrupt such communication when it is positioned to distribute pressure to another servo, the compensator valve means being semi-isolated from said servos and insensitive to changes in the pressure distributed in said servos upon movement of said shiftable valve means as it is shifted between its forward driving torque delivery position and its reverse driving torque delivery position.

References Cited by the Examiner
UNITED STATES PATENTS

| | | |
|---|---|---|
| 2,907,232 | 10/59 | Duffy. |
| 3,078,736 | 2/63 | Meads et al. |
| 3,095,755 | 7/63 | Duffy. |
| 3,103,129 | 9/63 | Egbert et al. |

DON A. WAITE, *Primary Examiner.*